April 14, 1931.  C. B. GRAY  1,801,153
SHEARING MACHINE TOOL
Filed Nov. 9, 1928
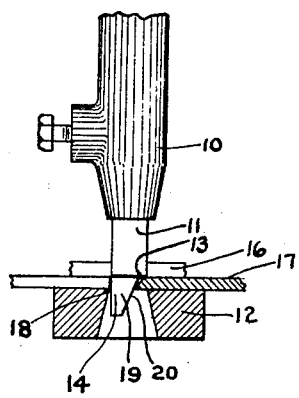
Fig. 1.
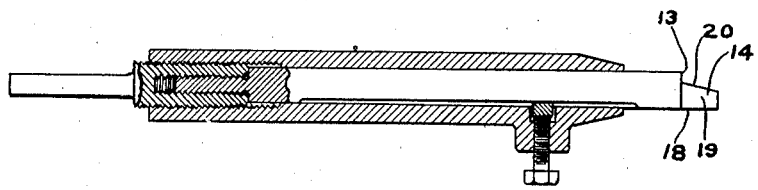 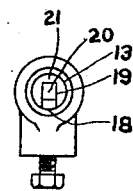
Fig. 2.  Fig. 3.
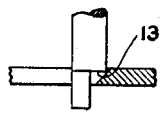
Fig. 4.
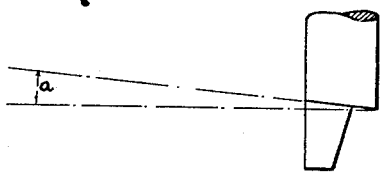
Fig. 5.
WITNESS
E. Lutz.
INVENTOR
Charles B Gray Patented Apr. 14, 1931

1,801,153

UNITED STATES PATENT OFFICE

CHARLES B. GRAY, OF MILLBOURNE, PENNSYLVANIA

SHEARING-MACHINE TOOL

Application filed November 9 1928. Serial No. 318,281.

My invention relates to cutting tools for machines of the reciprocatory shear type.

Machines of the character indicated are used for slotting or cutting suitable material by the step-by-step cutting action of a punch. Such machines usually comprise a mechanically reciprocated punch having a pilot portion and a cutting portion, the punch cooperating with a suitable die and the pilot portion serving to limit the increment of feed of a suitable blank. My present invention pertains to a cylindrical tool turnable in its cooperating die and suitable for use with a machine of this character and it has for its object to provide an improved type of pilot portion for such a tool—a pilot portion which permits of ready redressing of the tool, which assists in resisting deflection of the tool, and which is of such a design that cutting may take place even though spreading of the material back toward the pilot may take place in operation.

Referring to the drawings,

Fig. 1 is a fragmentary view of a punching machine with my improved tool applied thereto;

Fig. 2 is a longitudinal sectional view of a holder having the improved tool;

Fig. 3 is a plan view of the punch or cutting end of the tool; and,

Figs. 4 and 5 are diagrammatic views illustrating principles of my invention.

Referring to Fig. 1, I show a reciprocatory tool holder 10 having a cylindrical cutting tool or punch 11 carried thereby and cooperating with a die 12. The tool is provided with a cutting portion 13 and a pilot portion 14, a suitable templet 16 being employed in order to follow an outline as determined by the templet. I show the templet 16 arranged above the blank 17. In operation, after a cut and elevation of the cutting edge 13 above the blank, the latter is moved, while maintaining contact of the templet 16 with the tool shank, until the slot end engages the pilot portion. This feeding operation takes place as soon as the cutting edge 13 emerges from the blank or work 17, steps of feeding alternating with steps of cutting in order that a slot or cut in accordance with a desired outline may be produced. This type of machine, in general, is old; and, as my invention relates more particularly to the tool, the latter will now be described more in detail.

The pilot portion 14 has its back face 18 continuous with the cylindrical peripheral surface of the tool shank and its side and front faces 19 and 20 provided by removal of material of the tool, as by grinding. As shown, the pilot portion is approximately rectangular or elongated in cross-section, although it will be understood that any suitable shape may be employed so long as the advantages of my improved construction are obtained. Also it will be seen that the pilot extends in the direction of feed or transversely of the middle portion of the cutting edge 13, that is, at least that portion of the pilot adjacent to the cutting face has its cross-section elongated from the cylindrical boundary of the tool shank or body forwardly of the axis of the latter and in the direction of the cutting face diameter bisecting the cutting edge.

The distance of the front face 20, where it joins the transverse surface 21 providing the cutting edge 13, from the front or middle portion of the cutting edge 13 should be such that scalloped sides are avoided. Also, the side faces 19 are located sufficiently near to the axis of the tool that the blank or the tool may be readily turned to follow a curved or irregular outline.

As the faces 19 and 20 and the surface 21 are preferably flat, it will be apparent that the tool may be repeatedly redressed by simple grinding operations.

Since the back face 18 of the pilot portion 14 is continuous with the peripheral surface of the tool stock or shank and the pilot portion enters the die 12 before the cutting edge reaches the blank, such pilot portion cooperates with the die to prevent deflection of the tool due to cutting or shearing of the blank.

The front face 20 of the pilot is preferably relieved or inclined downwardly and rearwardly toward the back face 18 to avoid kickback of the blank. I have found that, with a front pilot face parallel to the axis or vertical, as shown in Fig. 4, feeding may be interfered with. The reason for this is that the front edge of a slot being cut is not normal to the blank but inclined downwardly and rearwardly, this undoubtedly taking place due to crowding and spreading of the metal incident to cutting or shearing. With a vertical front pilot face, the inclined front edge of the slot may contact therewith with no, or possibly very little, overlap of the top surface of the blank by the cutting edge 13; and, on the working stroke and with contact of the edge 13 with the inclined edge of the slot end, the blank would be kicked or pushed back with the result that cutting would cease. In Fig. 4, I show the action taking place when the pilot front face is vertical or parallel to the punch axis.

Therefore, I so arrange the front fact 20 of the pilot as to take into account the cutting or shearing in an inclined manner, the face being inclined downwardly and rearwardly, with the result that the blank may be fed further each time and with assurance that there is sufficient overlap of the blank by the cutting edge 13 to secure cutting in the desired manner.

Furthermore, I prefer to provide the tool with a certain amount of rake, that is, the transverse surface defining the cutting edge is inclined slightly upwardly and rearwardly, as shown in Fig. 5 where the plane of the cutting edge makes a small angle —a— with respect to the normal transverse plane. This makes possible a somewhat better shearing action.

In operation, the tool 11 is reciprocated up and down in a manner well known in the art. Each time the cutting edge 13 clears the top surface of the blank 17 on the up stroke of the tool, such blank is advanced until the front edge of the slot being cut contacts with the pilot 14, the cutting edge 13 overlapping the blank. On the next down stroke of the tool, cutting takes place to the extent of overlap. The pilot portion 14 is made sufficiently long and the stroke of the tool 11 is so arranged with respect to the blank and the die 12, that the lower end of the pilot 14 enters the die before the cutting edge 13 reaches the top surface of the blank, with the result that the die cooperates with the pilot to prevent backward deflection of the tool during the cutting stroke. The front face of the pilot is relieved or inclined downwardly and rearwardly so that feeding of the blank to the desired extent may take place.

While I have shown my invention in but one form, it will be obvious to those skilled in the art that it is not so limited but is susceptible of various changes and modifications without departing from the spirit thereof, and I desire, therefore, that only such limitations shall be placed thereupon as are imposed by the prior art or as are specifically set forth in the appended claims.

What I claim is:

1. In a slotting or cutting machine of the punch type, a cylindrical tool body having a circular cutting edge and a pilot extending longitudinally beyond the cutting edge; the pilot being approximately rectangular in cross-section and having front, side and back faces, the back face being a cylindrical surface element continuous with the body cylindrical surface, the side faces and the front face being disposed within the projected cylindrical surface of the tool body, and the front face being spaced from the cutting edge and converging toward the back face in the direction away from the cutting edge.

2. In a slotting or cutting machine of the punch type, a cylindrical tool body having a cutting face defined by a circular cutting edge and having a pilot extending beyond the face, at least that portion of the pilot adjacent to the cutting face having its cross-section elongated in the direction of the cutting face diameter bisecting the cutting edge and from the cylindrical boundary of the tool body at the back forwardly of the axis of the tool body and the sides and the front of the pilot being spaced inwardly from the tool body cylindrical boundary.

In testimony whereof I affix my signature.

CHARLES B. GRAY.